United States Patent [19]

White

[11] 4,146,697

[45] Mar. 27, 1979

[54] POLY(ORGANOSILOXY) TELECHELIC STYRENE POLYMER PROCESS

[75] Inventor: Dwain M. White, Schenectady, N.Y.

[73] Assignee: General Electric Company, Schenectady, N.Y.

[21] Appl. No.: 907,588

[22] Filed: May 19, 1978

[51] Int. Cl.² ............................ C08F 2/38; C08F 4/32; C08F 12/08; C08F 12/16

[52] U.S. Cl. .................................... 526/194; 526/218; 526/222; 526/227; 526/229; 526/230; 526/293; 526/346

[56] References Cited

U.S. PATENT DOCUMENTS

| | | | |
|---|---|---|---|
| 2,396,997 | 3/1946 | Fryling | 526/346 |
| 3,960,824 | 6/1976 | Hicks | 526/346 |
| 4,064,337 | 12/1977 | Uraneck et al. | 526/346 |

Primary Examiner—John Kight, III
Attorney, Agent, or Firm—F. Wesley Turner; Joseph T. Cohen; Charles T. Watts

[57] ABSTRACT

A poly(organosiloxy) telechelic styrene polymer polymerization process comprising contacting an olefin, a free radical polymerization initiator, and a poly(organosiloxyaryl) polysulfide is described. The poly(organosiloxy) terminated styrene polymers can be end capped and/or coupled with other polymeric materials. The styrene polymers can be molded, calendered, or extruded as films, sheets, fibers, laminates or other useful articles of manufacture.

6 Claims, No Drawings

POLY(ORGANOSILOXY) TELECHELIC STYRENE POLYMER PROCESS

CROSS REFERENCE TO RELATED APPLICATIONS

This invention is related to subject matter disclosed in my copending U.S. application Ser. Nos. 907,596 and 916,762, filed on 5-19-78 and 6-19-78, respectively. All of the aforesaid applications are assigned to the assignee of this application and all of the subject matter disclosed and referenced therein is incorporated herein in its entirety by reference.

BACKGROUND OF THE INVENTION

1. Field of the Invention

This invention relates to a poly(organosiloxy) telechelic styrene polymerization process which comprises contacting an olefin, a free radical polymerization initiator, and a poly(organosiloxy)organopolysulfide. The poly(organosiloxy) terminated styrene polymers can be end capped and/or coupled with other polymeric materials. The styrene polymers can be molded, calendered, or extruded into films, sheets, fibers, laminates or other useful articles of manufacture.

2. Description of the Prior Art

The polymerization of styrene either alone or in the presence of other copolymerizable monomers is well-known. In general the polymerization of styrene is described in terms of various reaction mechanisms including free radical initiation, propagation, chain transfer and termination reaction mechanisms.

Heretofore, to the best of my knowledge, the polymerization of styrene to form homopolymers or copolymers with other copolymerizable monomers has not been carried out in the presence of poly(organosiloxy)organopolysulfide reactants which perform two functions, i.e. (I) act as effective chain transfer agents and (II) form reactive organosiloxy styrene polymer end groups.

Although various radical polymerization and sulfur chemistry texts generally state that (a) "some organic disulfides via homolytic dissociation function as polymerization initiators", (b) "some mono- and disulfides, e.g. RSR and RSSR compounds dissociate to radicals either photochemically or thermally at moderate temperatures, and have been used as initiators of polymerization, and in some cases, complications arise from transfer to initiator which may be accompanied by retardation", (c) "that mercaptans as well as aryldisulfides act as chain transfer agents during the polymerization of styrene", I believe in view of the absence of known scientific evidence describing the reactions of poly(organosiloxy)organopolysulfides in the polymerization of styrene polymers under free radical polymerization reaction conditions that my observation that poly(organosiloxy)organopolysulfide are effective chain transfer agents and also provide polyfunctional reactive end groups for styrene polymers is unobvious.

DESCRIPTION OF THE INVENTION

This invention embodies a poly(organosiloxy) telechelic styrene polymerization process comprising contacting an olefin, a free radical polymerization initiator, and a poly(organosiloxy)organopolysulfide. The poly(organosiloxy) terminated styrene polymers can be end capped and/or coupled with other polymeric materials. The styrene polymers can be molded, calendered, or extruded as films, sheets, fibers, laminates or other useful articles of manufacture.

The expression olefin as employed herein and in the claims includes any free radical polymerizable olefin. Illustratively olefins include styrene; o-, m- and p-methylstyrene; 2,4-dimethylstyrene; 2,5-dimethylstyrene; 3,4-dimethylstyrene; 3,5-dimethylstyrene; p-ethylstyrene; p-isopropylstyrene; p-cyclohexylstyrene; o-, m- and/or p-fluorostyrene; 2-methyl-4-fluorostyrene; m- and p-chlorostyrene; p-bromostyrene; 1-vinylnaphthalene; 2-vinylnaphthalene; 1-vinyl-4-chloronaphthalene; 6-vinyl-1,2,3,4-tetrahydronaphthalene; 4-vinylbiphenyl and 9-vinylphenanthrene, etc. Olefin monomers are commonly referred to as "vinyl aromatic monomeric reactants" and said monomers can be copolymerized with other well-known olefinic materials in the preparation of various copolymers including — however not limited to — styrene-acrylonitrile; styrene-butadiene-acrylonitrile; styrene-butadiene; styrene-divinyl benzene; styrenemaleic anhydride; styrene-methyl methacrylate; styrene-vinyl acetate; styrene-isoprene, etc., copolymers.

In a presently preferred embodiment the "vinyl aromatic monomers" employed in the formation of homo- or co-polymers of styrene are of the formula:

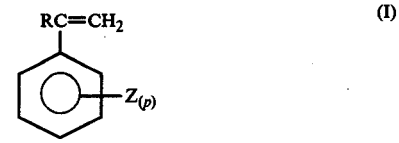

(I)

wherein independently R is hydrogen, lower alkyl or halogen, Z is a member selected from the class consisting of vinyl, hydrogen, chlorine and lower alkyl, and p is a whole number equal to from 0 to 5.

The expression "free radical polymerization initiator" as employed herein and in the claims includes any free radical polymerization initiators. Illustratively free radical polymerization initiators include persulfates, hydroperoxides, peresters, azo compounds, photoinitiators, etc. Those skilled in the art know that the type of free radical initiator employed can vary depending upon the particular type of polymer or copolymer being prepared since certain free radical species are more effective in polymerization of certain olefins, e.g. styrene, than others which are more effective in copolymerizing styrene with other monomer types, e.g. methylmethacrylate. Accordingly, selection of the appropriate free radical initiators will be apparent or can be readily determined by routine experimentation by those having ordinary skill in the art. By way of illustration, generally useful free radical polymerization initiators include the following: methyl peroxide; ethyl peroxide; propyl peroxide; isopropyl peroxide; tert-butyl peroxide; 1-hydroxybutyl-n-butyl peroxide; tert-amyl peroxide; tert-butyl-α-cumyl peroxide; 2,5-dimethyl-2,5-di(tert-butylperoxy)hexane; n-butyl-4,4-bis(tert-butylperoxy)-valerate; cumyl peroxide; acetyl peroxide; propionyl peroxide; butyryl peroxide; succinoyl peroxide; benzoyl peroxide; 4-bromobenzoyl peroxide; 3,5-dibromo-4-methoxybenzoyl peroxide; phenylacetyl peroxide; 5-phenylvaleryl peroxide; lauroyl peroxide; myristoyl peroxide; tert-butyl hydroperoxide; cumene hydroperoxide; tetralin hydroperoxide; tert-butyl peracetate; ethyl tert-butyl peroxalate; di(tert-butylperoxy)-oxalate; tert-butyl perbenzoate; tert-butyl-N-(3-chlorophenylperoxy) carbamate; tert-butyl 2-methylsulfonylperbenzoate; tert-butyl 4-(methylthio)perbenzoate; tert-butyl phenylperacetate; tert-butyl 4-tert-butylperbenzoate; 2,2'-azo-bis-isobutyronitrile; 1,1'-azo-bis-1-cyclobutanenitrile; 4,4'-azo-bis-4-cyanopentanoic acid; 2,2'-azo-bis-2,4-dimethylvaleronitrile; 1,1'-azo-bis-1-cycloheptane nitrile; 2,2'-azo-bis-2-cyclohexylpropionitrile; 1,1'-azo-bis-1-cyclodecane nitrile; 2,2'-azo-bis-propane; triazobenzene; azo-bis-isobutyramidine; 1,1'-azo-bis-1-phenylethane; 1,1'-azo-bis-1-phenylpropane; phenyl-azo-triphenylmethane; azo-bis-diphenylmethane; and 4-acetaminophenyl-azo-triphenylmethane.

The expression "poly(organosiloxy)organopolysulfide" as employed herein and in the claims includes illustratively any polysulfide of the formula:

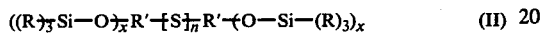  (II)

wherein independently each x is an integer at least equal to 1, n is an integer at least equal to 2, R is an alkyl, cycloalkyl, or aryl radical including combinations thereof, and R' is at least a divalent arene radical having at least one organosiloxy, i.e.

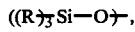, radical directly bonded to an aromatic ring carbon atom via the oxy radical of the siloxy group.

In a presently preferred embodiment, R contains 1–30, and R' contains 6–30 carbon atoms. In a still more preferred embodiment, R is a $C_{1-5}$ alkyl radical, R' is a $C_{6-10}$ aryl or aralkyl radical, x is equal to 1, and n is equal to 2.

Illustratively preferred polysulfides include: bis(4-trimethylsiloxyphenyl)disulfide, bis(4-trimethylsiloxyphenylmethylene)disulfide, bis(4-tri-t-butylsiloxyphenyl)disulfide, bis(4-triphenylsiloxyphenylethylene)disulfide, and bis(4-tripentylsiloxynaphthylene)disulfide, etc.

The polymerization process can be carried out employing any conventional polymerization technique for producing styrene homo- and copolymers, e.g. bulk polymerization, solution polymerization, suspension polymerization, emulsion polymerization, continuous bulk/solution polymerization, etc. Polymerization reaction temperatures can be any reaction temperatures in which the polymerization reaction takes place, e.g. 0° C. or less to 150° C. or more, and preferably from 25° C. to about 100° C. Broadly, the reaction time varies with the quantity of reactant as well as the life of the free radical initiator employed, however basically the reaction time can be any time, e.g. from about 1/10 hr. or less to 10 hours or more. Those skilled in the art can readily determine the appropriate reaction time and temperatures through routine experimentation.

The following examples illustrate the best mode of the invention.

EXAMPLE I

Preparation of Bis(4-trimethylsiloxyphenyl)disulfide

Hexamethyldisilazane (19.4 gms., 0.12 mole was added to solid bis(4-hydroxyphenyl)disulfide (20 gms., 0.08 mole). The reaction began immediately giving a clear liquid. After 4 hours excess hexamethyldisilazane was removed by warming and evaporation. Gas chromatography showed no starting disulfide and only a trace of monohydroxy disulfide. The liquid product crystallized on cooling at 5° C. m.p. 21°–22°. The $^1$H nmr was consistent with a disilylated disulfide of the formula:

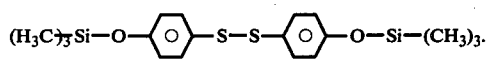

EXAMPLE II

Preparation of Poly(trimethylsiloxy)telechelic Styrene Polymer

Styrene (100 gms., 0.96 mole, freshly distilled), azobisisobutyronitrile (0.05 gms.) and bis(4-trimethylsiloxyphenyl)disulfide (5.83 gms., 0.15 mole) were heated under nitrogen in a 4 oz. screw-cap bottle for seven days at 50 + 3° C. The clear viscous liquid was diluted with toluene and precipitated by adding to 500 ml. methanol containing a solution of 2 gms. calcium nitrate in 50 ml. ethanol in a stirred blender. The polymer was filtered off, dried, and reprecipitated as above, then dried, redissolved in toluene and precipitated by dropwise addition into 3 l. of methanol containing 1 ml. conc. hydrochloric acid. After filtering and drying, the polymer weighed 50.4 gms., exhibited an intrinsic viscosity (measured in chloroform at 25° C.) of 0.20 dl./g., and an infrared absorbance at 3590 cm.$^{-1}$ of 0.238 (500 mg./10 ml. $CS_2$).

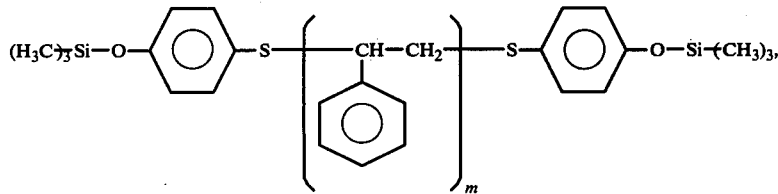

m being a number average of within the range of from about 150 to 250.

The poly(organosiloxy)telechelic styrene polymers prepared in accordance with the process of this invention — being bifunctional — can be advantageously combined with the novel bifunctional quinone-coupled oxides polyphenylene oxides described in my copending U.S. patent application Ser. No. 800,635, filed May 26, 1977. Because of the reactive bifunctional character of the novel polystyrene polymers prepared by the process of this invention, novel polystyrene-polyphenylene oxide block polymers claimed in my copending U.S. patent application Ser. No. 916,762, filed June 19, 1978 can be prepared which are useful in a wide variety of articles of manufacture.

I claim:

1. A poly(organosiloxy) telechelic styrene polymer polymerization process comprising contacting an olefin, a free radical polymerization initiator, and a poly(organosiloxy)organopolysulfide.

2. The claim 1 process wherein the olefin is a vinyl aromatic monomeric reactant, the initiator is selected from peroxides, persulfates, hydroperoxides, peresters, azo compounds or photoinitiators, and the polysulfide is of the formula

wherein independently each x is an integer at least equal to 1, n is an integer at least equal to 2, R is an alkyl, cycloalkyl, or aryl radical including combinations thereof, and R' is at least a divalent arene radical having at least one organosiloxy

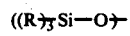

radical directly bonded to an aromatic ring carbon atom via the oxy radical of the siloxy group.

3. The claim 2 process wherein the vinyl monomer is of the formula

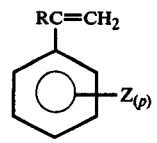

wherein independently R is hydrogen, lower alkyl or halogen, Z is a member selected from the class consisting of vinyl, hydrogen, chlorine and lower alkyl, and p is a whole number equal to from 0 to 5.

4. The claim 2 process wherein R is a $C_{1-5}$ alkyl radical, R' is a $C_{6-10}$ aryl or arylalkyl radical, x is equal to 1 and in is equal to 2.

5. The claim 4 process wherein the free radical polymerization initiator is an azo compound.

6. The claim 5 process wherein the vinyl monomer is styrene, the polysulfide is bis(4-trimethylsiloxyphenyl) disulfide and the azo compound is 2,2'-azo-bis-isobutyronitrile.

* * * * *